Figure 1:
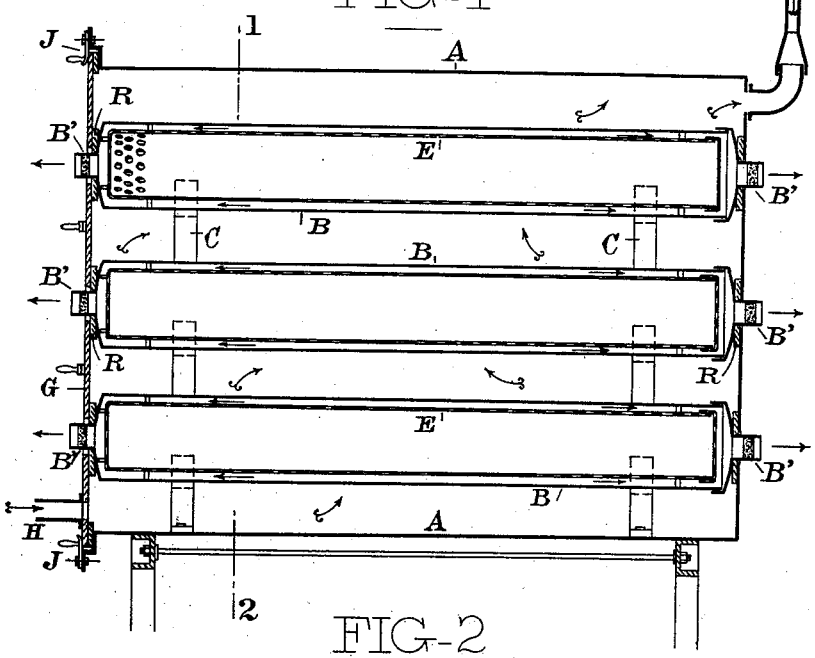

(No Model.)

A. MOYET.
STERILIZING APPARATUS.

No. 605,738. Patented June 14, 1898.

Witnesses
Xavier Janicot
Jean Germain

Inventor
Alfred Moyet

UNITED STATES PATENT OFFICE.

ALFRED MOYET, OF LYONS, FRANCE.

STERILIZING APPARATUS.

SPECIFICATION forming part of Letters Patent No. 605,738, dated June 14, 1898.

Application filed December 20, 1897. Serial No. 662,667. (No model.)

*To all whom it may concern:*

Be it known that I, ALFRED MOYET, a citizen of the Republic of France, residing at 7 Rue du Bât d'Argent, Lyons, in the Republic of France, have invented certain new and useful Improvements in Apparatus for Sterilizing Meat in the Raw State, of which the following is a specification.

This invention relates to apparatus for enabling meat intended for consumption in the raw state to be sterilized in the form of powder by the agency of heat.

Meat preparations, such as preserved meat or meat extracts, leave much to be desired, as a rule, when regarded from the point of view of the full utilization of the reconstituent or flesh-forming elements of the food, as the various processes generally adopted for the preservation of meat to a greater or less extent impair its qualities or debase its value as nutriment.

Now this invention relates to certain apparatus permitting meat to be treated in such a manner as entirely to exterminate all infectious or parasitic germs without, however, resorting to coction or boiling, with the resulting advantage that raw meat may be supplied for consumption in a powdered condition, in which it may be preserved indefinitely with perfect immunity from any pathogenic bacilli or noxious fermentation, whether such as might be originated by disease having attacked the animal while it was yet alive or such as would otherwise result from decay after killing.

*Description of preliminary process.*—The beef or other butcher's meat is on the day after killing stripped of its aponeuroses, fat, and sinews or tendons and cut into somewhat long but comparatively narrow bands or strips. These strips are steeped for two hours consecutively in a glazed earthenware vessel or receiver containing a perserving and sterilizing liquor, or such receiver may be made of metal being proof against the action of the chemicals used, the composition and preparation of the said liquor being as follows:

Ingredients: White-willow bark, ten grams; poplar-bark, fifteen grams; flowers of arnica, ten grams; sea-salt in crystals, one hundred grams; tannin, prepared with ether, one-half gram; alcohol, 95°, fifty grams; essence or oil of mustard, two drops; beech creosote, one drop; essence or oil of cinnamon, ten drops; essence or oil of citron, six drops; essence or oil of cloves, six drops; spring or river water, one liter.

The several kinds of bark are for twenty minutes boiled in three-fourths of the above quantity of water. Then the flowers of arnica are added and allowed to infuse or draw for another twenty minutes. The essences are meantime dissolved in the alcohol and the salt and tannin are added, together with the remainder of the water, and, lastly, the two liquors are mixed together. The resulting liquid may serve for several steeping operations, such as the one above referred to, it being only necessary to decant off the upper part of it from time to time. The strips of meat, after having been thus treated, are chopped by means of any suitable chopping-machine, the basins or pans of which should, however, be polished and tinned, so as to prevent the meat from turning black through contact with metal, such as cast-iron. The meat thus chopped is next subjected to ventilation at the ambient temperature in a special rectangular chamber or room, of which the wall that is facing the ventilator is fitted with a tall draught-chimney. Ventilators of any construction may be serviceable for this operation, a helical ventilator being preferable, however, by reason of the increased propelling power it is capable of exercising upon the air.

Inasmuch as the object of the ventilation is to dry the meat, it should be continued for about three weeks, care being taken, however, during that time to turn over the meat, which should previously have been placed in the said chamber upon open-work trays of polished wood. Having been so dried, the meat is submitted to a process of sterilization or "pasteurization" through the agency of heat and by the aid of apparatus such as is represented in the accompanying drawings, wherein—

Figure 2:
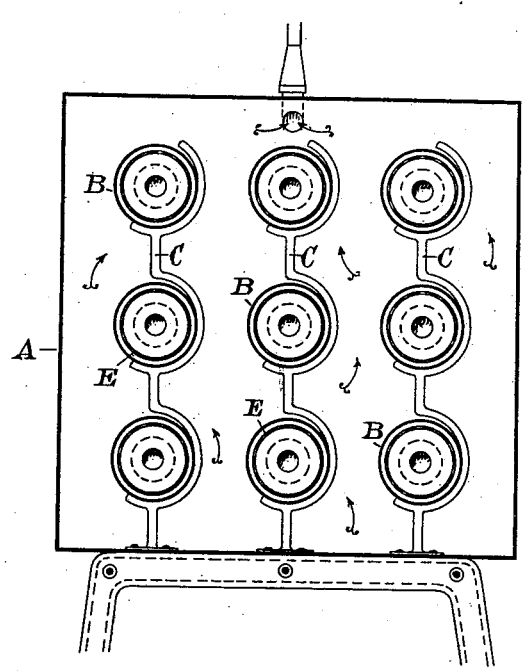

Figure 1 is a longitudinal section of the apparatus; and Fig. 2, a cross-section on line 1 2, Fig. 1.

This apparatus enables all the germs that may be contained in the meat to be destroyed without boiling the meat or in any way modifying its chemical nature or composition.

The object of the apparatus is to heat the meat after it has been chopped and dried cold by exposure to the air in cylinders wherein a temperature of about 100° centigrade is maintained by a current of steam which is not under pressure or only subjected to a very slight pressure, while at the same time the said apparatus enables the air contained in the said cylinders to be expelled to the outside and also to be readmitted through the same orifices under a cooling influence, such air being filtered as it reënters the cylinders through a pad made of cotton impregnated with boracic acid or of any other spongy, hygroscopic, and antiseptic substance.

The said apparatus, as shown in Figs 1 and 2, consists of a rectangular chamber or oven adapted to contain a series of tin or tinned-sheet-metal cylinders B B B, the number of which may be varied according as operations are conducted on a smaller or larger scale, such cylinders being supported within the said chamber or oven by metal supports or brackets C and each cylinder terminating at both ends in hollow tubes B', which on one side extend beyond the wall of the oven and on the other protrude through the front door G of the same.

In order to make perfectly tight joints between the cylinder ends and both the bottom wall and door of the oven, washers R, of non-vulcanized india-rubber, are interposed between those parts. The tinned and very thin sheet-metal cylinders B, all of which are constructed after the same pattern, are each provided internally with a circular basket or cage E, which is to contain the meat to be "pasteurized." All the cylinders B and cages E are, moreover, on one side fitted with a readily-removable lid or cover.

The method of sterilization by means of this apparatus is as follows: The meat, after having been dried, is placed in the several cages or baskets E and when the lids have been placed in position and the cages themselves arranged in their respective cylinders the door G is shut and bolted by means of bolts, such as J. Steam is now admitted through the jet-tube H, its pressure being reduced by any suitable device—such as a tapering nozzle, a tap, or the like—in proportion as it is delivered. In half an hour's time the oven is opened and the cylinder B removed and suddenly cooled down to from 10° to 12° centigrade. Finally the meat is taken out of the cages, grated to as fine a state of division as practicable, sifted, and then placed in receivers adapted to keep it protected from moisture or dampness.

In order to impart a more pleasant flavor to the meat, a small proportion of crystallized vanillin—say, one gram per kilogram of meat—may be added to it.

What I claim is—

1. In a sterilizing apparatus, the combination with a suitable tank or vessel having a steam-inlet and a steam-outlet, of a plurality of perforated and jacketed cylinders suitably supported within said tank or vessel and having their ends open to the outer atmosphere, and a door for obtaining access to the said tank or vessel, substantially as described.

2. In a sterilizing apparatus, the combination with a suitable tank or vessel having a steam-inlet and a steam-outlet, of a plurality of perforated and jacketed cylinders removably supported within the tank or vessel and each cylinder provided with hollow end extensions which extend through the side walls of the tank or vessel, and a door for obtaining access to the interior of the said tank or vessel.

In testimony whereof I have hereunto set my hand in presence of two subscribing witnesses.

ALFRED MOYET.

Witnesses:
XAVIER JANICOT,
JEAN GERMAIN.